US008698767B2

(12) United States Patent
Kwak et al.

(10) Patent No.: US 8,698,767 B2
(45) Date of Patent: Apr. 15, 2014

(54) TOUCH SCREEN PANEL

(75) Inventors: Won-Kyu Kwak, Yongin (KR);
Jae-Yong Lee, Yongin (KR);
Chang-Yeop Kim, Yongin (KR);
Jeong-Yeol Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 166 days.

(21) Appl. No.: 13/067,067

(22) Filed: May 5, 2011

(65) Prior Publication Data

US 2012/0044165 A1 Feb. 23, 2012

(30) Foreign Application Priority Data

Aug. 19, 2010 (KR) .................. 10-2010-0080442
Jan. 18, 2011 (KR) .................. 10-2011-0004977

(51) Int. Cl.
*G06F 3/041* (2006.01)

(52) U.S. Cl.
USPC ...... 345/173; 345/174; 178/18.05; 178/18.06

(58) Field of Classification Search
USPC ................................. 345/172–175
See application file for complete search history.

(56) References Cited

U.S. PATENT DOCUMENTS

| 8,159,467 | B2 | 4/2012 | Gray et al. |
| 2005/0242743 | A1 | 11/2005 | Kwak |
| 2007/0236618 | A1 | 10/2007 | Maag et al. |
| 2008/0024712 | A1 | 1/2008 | Kim |
| 2008/0277259 | A1 | 11/2008 | Chang |
| 2009/0322704 | A1* | 12/2009 | Anno .............................. 345/174 |
| 2010/0079393 | A1 | 4/2010 | Dews |
| 2010/0085326 | A1 | 4/2010 | Anno |
| 2010/0182249 | A1 | 7/2010 | Kang et al. |
| 2010/0283757 | A1* | 11/2010 | Wu et al. ........................ 345/174 |
| 2011/0134055 | A1* | 6/2011 | Jung et al. ..................... 345/173 |
| 2011/0141039 | A1* | 6/2011 | Lee ................................ 345/173 |

FOREIGN PATENT DOCUMENTS

| CN | 101114656 A | 1/2008 |
| CN | 101477430 A | 7/2009 |
| CN | 101520708 A | 9/2009 |
| CN | 101620490 A | 1/2010 |
| CN | 101706695 A | 5/2010 |
| CN | 101719037 A | 6/2010 |
| CN | 101751192 A1 | 6/2010 |
| EP | 2 157 500 A2 | 7/2009 |

(Continued)

OTHER PUBLICATIONS

Korean Office action dated Aug. 23, 2013.

(Continued)

*Primary Examiner* — Quan-Zhen Wang
*Assistant Examiner* — Tony Davis
(74) *Attorney, Agent, or Firm* — Lee & Morse, P.C.

(57) ABSTRACT

The present embodiments provide a touch screen panel. The touch screen panel may include: a plurality of first sensing patterns connected to each other in a long side direction of a screen, the plurality of first sensing patterns having at least one indenting unit inwardly indented from respective sides of a polygon; and a plurality of second sensing patterns connected to each other in a short side direction of the screen, the second sensing patterns having at least one protrusion protruding outwardly from respective sides of a polygon. Vertical and horizontal edges of the first sensing patterns and the second sensing patterns are tilted by a predetermined angle.

10 Claims, 5 Drawing Sheets

(56) References Cited

FOREIGN PATENT DOCUMENTS

| | | | |
|---|---|---|---|
| JP | 2010-140370 A | 6/2010 | |
| KR | 10-2009-0011244 A | 2/2009 | |
| KR | 10-2009-0093671 A | 9/2009 | |
| KR | 10-2010-0084250 | 7/2010 | |
| TW | 201009670 A1 | 3/2010 | |

OTHER PUBLICATIONS

Chinese Office Action dated Nov. 6, 2013.
Taiwanese Office Action dated Jan. 24, 2014.

* cited by examiner

TOUCH SCREEN PANEL

CROSS-REFERENCE TO RELATED APPLICATION

This application claims priority to and the benefit of Korean Patent Application No. 10-2010-0080442, filed on Aug. 19, 2010, and Korean Patent Application No. 10-2011-0004977, filed on Jan. 18, 2011, in the Korean Intellectual Property Office, the entire content of which is incorporated herein by reference.

BACKGROUND

1. Field

Embodiments relate to a touch screen panel provided in an image display device.

2. Description of the Related Art

A touch screen panel is an input device. The touch screen panel enables a person to select an instruction with his/her finger or a tool. The touch screen panel also enables a person to input a user command. The instruction is displayed on a screen of an image display device.

The touch screen panel is provided in a front face of the image display device. The touch screen panel converts a contact position on the screen into an electrical signal from a finger or a tool that directly contacts the screen. Thus, an instruction selected at the contact position is input to the device as an input signal.

The touch screen panel may increase a range of applications because the touch screen panel can be a substitute for a separated input device. The separated input device may be a keyboard and a mouse, coupled to an image display device.

Known touch screen panels include a resistive touch screen panel, a capacitive touch screen panel, and an infrared touch screen panel.

A capacitive touch screen panel converts a contact position into an electric signal by sensing change of electrostatic capacity. The change of electrostatic capacity is generated by a conductive sensing pattern in association with other sensing patterns or a ground electrode. The conductive sensing pattern, in association with other sensing patterns or a ground electrode, occurs when a finger or an object contacts the touch screen.

The capacitive touch screen panel includes a plurality of sensing patterns connected to each other in a first direction and a plurality of sensing patterns connected to each other in a second direction crossing the first direction to obtain a coordinate of a contact position.

In a normal image display device, a transversal length is different from a longitudinal direction, so that the touch sensitivity in the first direction may be different from the touch sensitivity in the second direction.

In a normal image display device, the touch sensitivity is determined by a ratio between base capacitance and touch capacitance. The touch sensitivity is improved as the base capacitance is small and the touch capacitance is large. Therefore, when the transversal length of the screen is different from the longitudinal length, sensing patterns in a long side are connected to each other more than those in a short side. Thus, the base capacitance is increased so that the touch sensitivity is lowered.

SUMMARY

Embodiments are therefore directed to a touch screen panel, which substantially overcome one or more of the problems due to the limitations and disadvantages of the related art.

It is therefore a feature of an embodiment to provide a touch screen panel for improving touch sensitivity by making an area of first sensing patterns be different from an area of second sensing patterns when the first sensing patterns arranged in a first direction, the second sensing patterns arranged in a second direction, and bridge patterns for connecting the first or second sensing patterns to each other, which are arranged on the same layer, are formed.

It is therefore another feature of an embodiment to provide a touch screen panel in which the touch screen panel is positioned on an upper substrate for forming a display panel of the flat display device and in which vertical/horizontal edge units of first and second sensing patterns formed in the touch screen panel and bridge patterns are inclined by a predetermined angle so that interference the sensing patterns with pixels arranged on a display region of the flat display panel in the form of stripe is prevented to improve visibility.

It is therefore another feature of an embodiment to provide a touch screen panel in which dummy patterns are formed between first and second adjacent sensing patterns, and a tummy pattern structure is optimized to improve visibility of pixels corresponding to the dummy patterns.

At least one of the above and other features and advantages may be realized by providing a touch screen panel including: a plurality of first sensing patterns connected to each other in a long side direction of a screen, the first sensing patterns having at least one indenting unit inwardly indented from respective sides of a polygon; and a plurality of second sensing patterns connected to each other in a short side direction of the screen, the plurality of second sensing patterns having at least one protrusion protruding outwardly from respective sides of a polygon, wherein vertical and horizontal edges of the first sensing patterns and the second sensing patterns may be tilted by a predetermined angle.

In addition, the first sensing patterns or the second sensing patterns are electrically connected to the adjacent sensing patterns on a same line by bridge patterns, and the bridge patterns are obliquely arranged by excluding vertical and horizontal directions.

At this time, the bridge patterns are made of low resistance opaque metal and the first sensing patterns and the second sensing patterns are made of transparent conductive material.

In addition, the touch screen panel further includes a plurality of island dummy patterns between the first sensing patterns and the second sensing patterns and the dummy patterns are made of the same transparent conductive material as those of the first sensing patterns and the second sensing patterns.

In addition, the predetermined angle ranges from 2 degrees to 10 degrees and the at least one protrusion of the second sensing patterns include a plurality of protrusions, the at least one indenting unit of the first sensing patterns includes a plurality of indenting units, and the protrusions of the second sensing patterns are positioned in a space generated by indenting units of the first sensing patterns.

At least one of the above and other features and advantages may also be realized by providing first sensing patterns and second sensing patterns on an upper substrate of a flat display panel, and more detail, the first sensing patterns and the second sensing patterns are formed in regions where the first and second sensing patterns are overlapped with a plurality of pixels provided in a pixel region of the flat display panel, and a pitch of the pixels is not a multiple of a pitch of the first and second sensing patterns by any factor that is an integer.

The touch screen panel may further include a dummy pattern formed between the first sensing patterns and the second sensing patterns and the dummy pattern is made of a same transparent conductive material as that of the first sensing patterns and the second sensing patterns.

The dummy pattern may include a plurality of island dummy patterns and horizontal edge units and/or vertical edge units of the plurality of dummy patterns are implemented such that a length, in which the horizontal edge units and/or the vertical edge units are overlapped with a plurality of pixels, is minimal.

The horizontal edge units and/or vertical edge units of the dummy patterns, the first sensing patterns, and the second sensing patterns, have an angle of about 10 degrees to 80 degrees against the arrangement direction of the pixels and the dummy patterns have a polygonal shape.

The dummy patterns are formed to be coupled with each other between the first sensing patterns and the second sensing patterns.

BRIEF DESCRIPTION OF THE DRAWINGS

The above and other features and advantages will become more apparent to those of ordinary skill in the art by describing in detail exemplary embodiments with reference to the attached drawings, in which:

FIG. 2B illustrates an enlarged plan view of a specific portion of FIG. 2A; a

DETAILED DESCRIPTION

Example embodiments will now be described more fully hereinafter with reference to the accompanying drawings; however, they may be embodied in different forms and should not be construed as limited to the embodiments set forth herein.

Hereinafter, the embodiments which may easily be implemented by those skilled in the art, will be described in detail with reference to FIGS. 1-3B.

Figure 1:
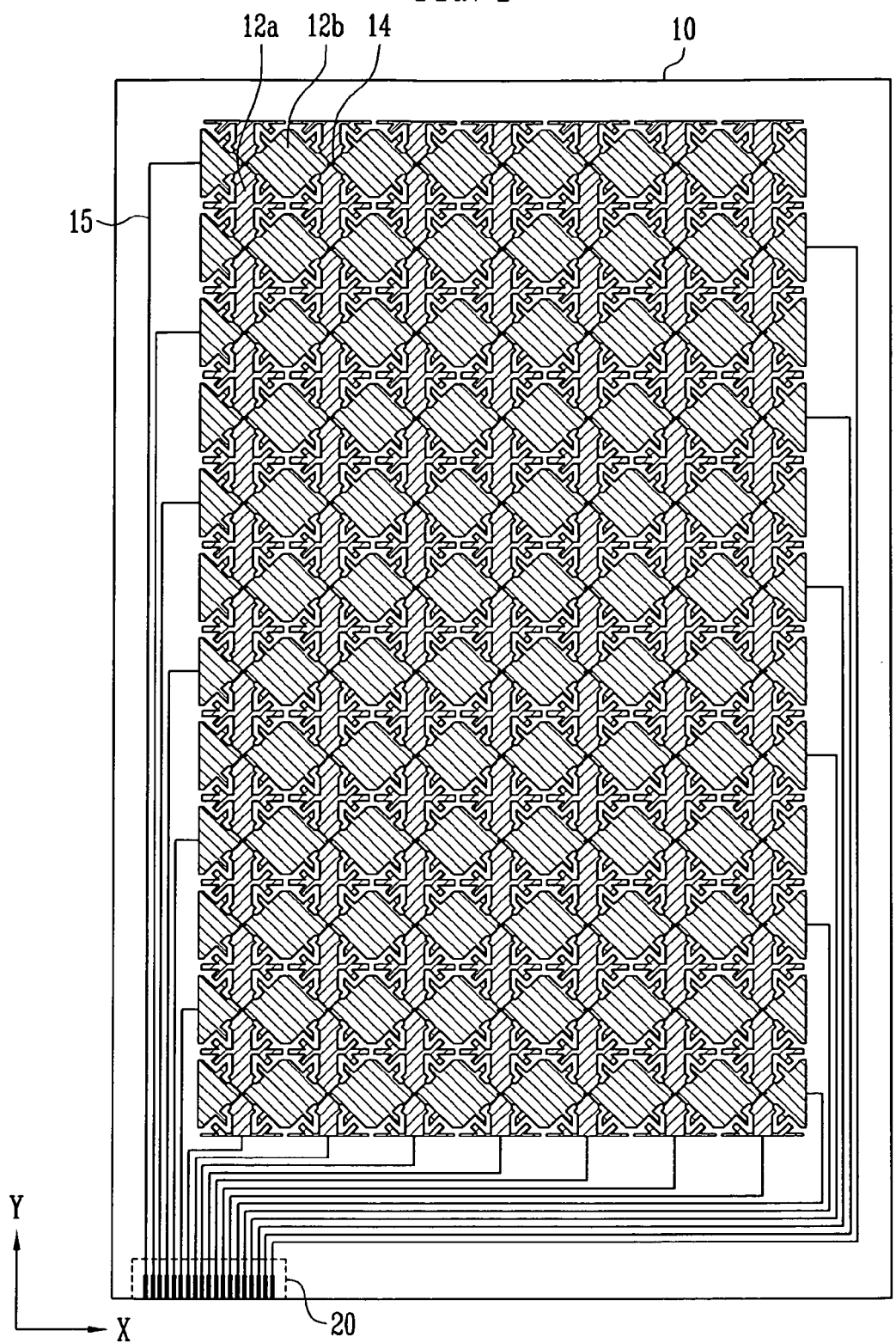
FIG. 1 illustrates a plan view schematic of a touch screen panel according to an embodiment.

FIG. 1 is a plan view schematically of a touch screen panel according to an embodiment.

Referring to FIG. 1, a touch screen panel, according to an embodiment, is a capacitive touch screen panel and includes a transparent substrate 10, a plurality of first sensing patterns 12a, second sensing patterns 12b formed on the transparent substrate 10, and a position detecting lines 15. The position detecting lines 15 connect the first sensing patterns 12a and the second sensing patterns 12b to an external driving circuit through a pad unit 20.

The first sensing patterns 12a are formed to be connected to each other in a long side direction of a screen using a transparent electrode material, e.g. indium-tin-oxide (ITO). For example, when the long side direction is a vertical direction (Y-axis direction), the first sensing patterns 12a are formed to be connected to each other in a column direction within a screen. The first sensing patterns 12 may be connected to respective position detecting lines 15 every column unit.

When the long side direction of the screen is a horizontal direction (X-axis direction), the first sensing patterns 12a may be formed to be connected to each other. The first sensing patterns 12a may be formed to be connected to each other in a row direction within the screen. For convenience, it is assumed that the long side direction of the screen is the column direction.

The first sensing patterns 12a may be patterned to be connected to each other in the column direction of the screen. The first sensing patterns 12a also may be formed to have separated patterns. Thus, the first sensing patterns 12a arranged on the same column may be connected to each other by separated bridge patterns.

The second sensing patterns 12b, similar to the first sensing patterns 12a, are formed using transparent electrode material. The second sensing patterns 12b are formed to be connected in a short side direction of the screen.

When the short side direction of the screen is a horizontal direction (X-axis direction), the second sensing patterns 12b may be formed to be connected to each other in the row direction within the screen. The second sensing patterns 12b may be connected to the position detecting lines 15 of every row unit, respectively.

The second sensing patterns 12b may be patterned to be connected to each other in the row direction of the screen. The second sensing patterns 12b may also be formed to have separated patterns. Thus, the second sensing patterns 12b arranged on the same row may be connected by separated bridge patterns.

In the present embodiment, a structure will be described in which the first sensing patterns 12a are patterned to be connected to each other in the column direction of the screen and the second sensing patterns 12b are connected to each other by the separated bridge patterns 14.

When the first sensing patterns 12a and the second sensing patterns 12b are positioned on different layers, both the first sensing patterns 12a and the second sensing patterns 12b may be patterned to be connected to each other in the column direction and in the row direction, respectively.

The position detecting lines 15 connect the first sensing patterns 12a and the second sensing patterns 12b to an external driving circuit (not shown). The external driving circuit may be a position detecting circuit through the pad unit 20.

The position detecting lines 15 may be disposed outside the screen on which an image is displayed. The position detecting lines 15 may be made of various low resistance materials, e.g. molybdenum (Mo), silver (Ag), titanium (Ti), copper (Cu), aluminum (Al), molybdenum/aluminum/molybdenum (Mo/Al/Mo), in addition to the transparent materials used to form the first and second sensing patterns 12a and 12b. The bridge patterns 15 may be made of the same materials as those of the position detecting lines 15 by the same process.

When a contact object, such as a human hand or a touch stick, makes contact with the above-mentioned touch screen panel, a change of capacitance occurs. The change of capacitance by the contact position is transmitted from the sensing patterns 12a and 12b to a driving circuit (not shown) via the position detecting lines 15 and the pad unit 20. The change of capacitance is converted into an electric signal by an X-input processing circuit and a Y-input processing circuit (not shown). Thus, the contact position is obtained.

The touch screen panel may be formed on an independent substrate to be attached on an image display device. The touch screen panel may also be formed on an independent substrate to be integrated with a display panel of the image display device.

The touch screen panel may be formed on an upper substrate of an organic light emitting display panel or a liquid crystal display panel. Thus, the touch screen may be integrated with the display panel. When the display panel and the touch screen panel are integrated with each other, a thin image display device may be provided.

When respective pattern shapes and sizes of the first sensing patterns 12a and the second sensing patterns 12b are substantially the same, base capacitance in the long side direction of the screen and the base capacitance in the short side direction of the screen are different from each other. Thus, touch sensitivity may be deteriorated.

When a touch input is performed to the touch screen panel, it is assumed that a change of capacitance is generated by the contacted sensing patterns. Therefore, touch capacitance is $\Delta C$ and the base capacitance of the sensing patterns before the touch is Cnode. Thus, the touch sensitivity is $\Delta C$/Cnode.

The base capacitance is generated for the structural problem. The base capacitance has major elements, such as parasitic capacitance generated between other elements of the display panel positioned under the touch screen panel. For example, a parasitic capacitance may be generated from a cathode electrode formed on the front surface of the organic light emitting display panel. The parasitic capacitance may also be generated from a common electrode formed on the front surface of liquid crystal display panel. The parasitic capacitance may also be generated from the first sensing patterns 12a and the second sensing patterns 12b.

The parasitic capacitance, generated between grounded signal lines of the display panel, the first sensing patterns 12a, and the second sensing patterns 12b, may also be auxiliary element of the base capacitance.

The touch capacitance is intended to realize the touch screen panel. Thus, means capacitance, which is changed by a generated touch event, is used to detect the position.

Therefore, the touch sensitivity of the touch screen panel is improved as the base capacitance is small and the touch capacitance is large. When the first sensing patterns 12a are connected to each other in the long side direction of the screen, they are more in number than the second sensing patterns 12b connected to each other in the short side direction. Thus, the base capacitance of the first sensing patterns 12a is greater than that of the second sensing patterns 12b. The touch capacitance of the first sensing patterns 12a is the same as the second sensing patterns 12b. Generally, the touch sensitivity in the long side direction of the screen is low, and overall touch sensitivity of the touch screen panel is deteriorated.

In the present embodiment, in order to prevent the deterioration of the touch sensitivity, respective areas of the first sensing patterns 12a are reduced so that the large base capacitance in the long side direction of the screen is reduced. In order to reduce differences between the base capacitance in the long side direction and in the short side direction of the screen, the second sensing patterns 12b are designed to have increased areas.

The present embodiment modifies the pattern shapes of the sensing patterns such that the respective areas of the first sensing patterns 12a are smaller than those of the second sensing patterns 12b. Modifying the pattern shapes of the sensing patterns reduces the difference between the base capacitances in the long side direction and in the short side direction of the screen. Thus, the touch sensitivity of the touch screen panel may be improved An example of the pattern shapes of the first sensing patterns 12a and the second sensing patterns 12b will be described with reference to FIGS. 2A-3B.

Figure 2A:
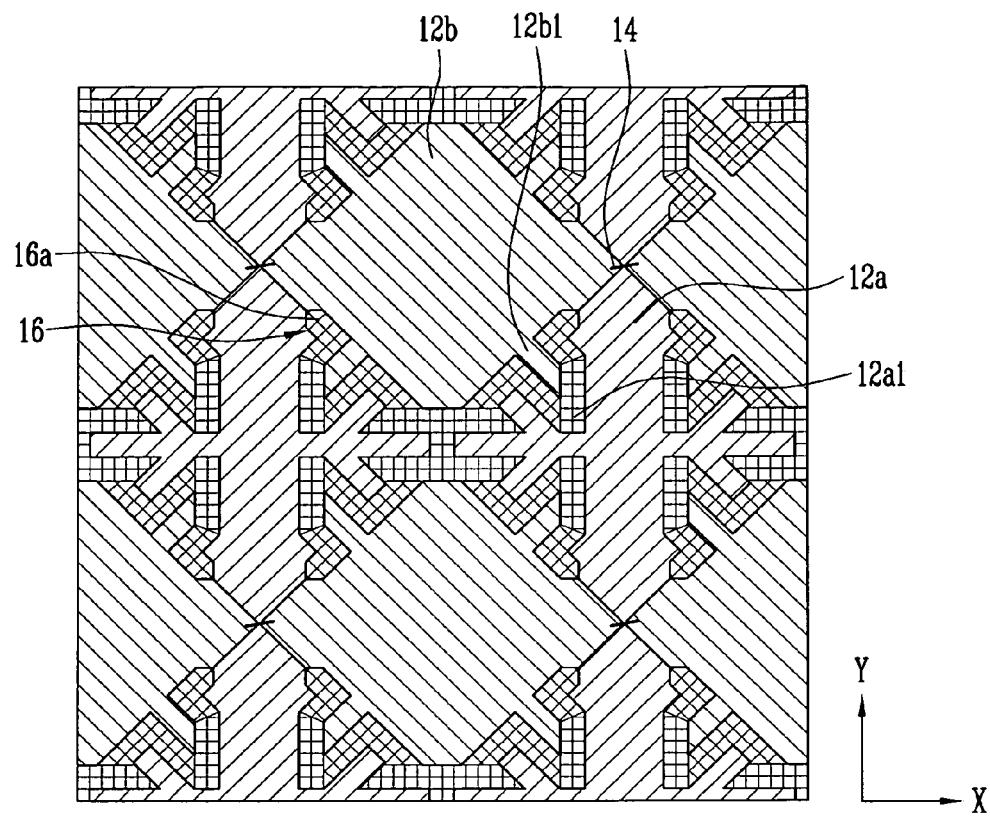
FIG. 2A illustrates a main plan view of a first sensing patterns and second sensing patterns according to an embodiment.
Figure 2B:
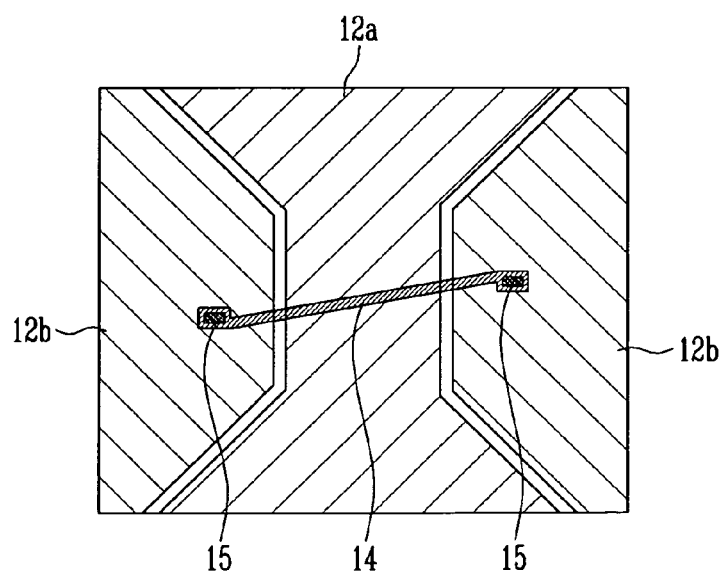

FIG. 2A is a main plan view illustrating first sensing patterns and second sensing patterns according to an embodiment. FIG. 2B is an enlarged plan view of a specific portion of FIG. 2A.

As described with reference to FIG. 1, the first sensing patterns 12a are patterned to be connected to each other in the column direction (Y-axis direction) of the screen. The second sensing patterns 12b are arranged in the row direction (X-axis direction) of the screen, and are connected to each other in the column direction (Y-axis direction) in the long side direction of the screen. The second sensing patterns 12b may be separated from each other by bridge patterns 14.

Referring to FIG. 2A, the first sensing patterns 12a are patterned to have at least one indenting units 12a1 inwardly indented from respective sides of a polygon (that is, inwardly patterned in a indented shape).

The second sensing patterns 12b positioned adjacent to the first sensing patterns 12a are patterned to have at least one protrusion 12b1 outwardly protruding from the respective sides of the polygon (that is, outwardly patterned in a protrusion shape).

The protrusions 12b1 of the second sensing patterns 12b have a shape corresponding to the indenting units 12a1 of the first sensing patterns 12a. The protrusions 12b1 are positioned in spaces formed by the indenting units 12a1.

When the first sensing patterns 12a and the second sensing patterns 12b have the same diamond shape, areas of the second sensing patterns 12b are increased as much as the number of the protrusions 12b1. Areas of the first sensing patterns 12a are also decreased as much as the number of the indenting units 12a1.

As areas of the respective first sensing patterns 12a are decreased, respective channels in the long side direction of the screen, that is, base capacitance at respective channels in the column direction, is decreased so that touch sensitivity is improved. Width and number of the indenting units of the first sensing patterns 12a inwardly formed from the respective sides may be determined by experiments such that the base capacitance is reduced within a range. The range must satisfy a predetermined touch capacitance required for the touch screen panel.

The base capacitance in the long side direction of the screen is decreased by decreasing the areas of the first sensing patterns 12a. The base capacitance in the short side direction of the screen is increased by increasing the areas of the second sensing patterns 12b. Thus, the size of the base capacitances in the long side direction and the short side direction of the screen may be precisely matched.

The second sensing patterns 12b are patterned to have the protrusions 12b1 protruding outwardly from the respective sides of the polygon. The polygon may have a diamond shape. As illustrated in the drawings, the first sensing patterns 12a and the second sensing patterns 12b are positioned close to each other. Thus, a space for the increased areas of the second sensing patterns 12b may be guaranteed as much as areas of the first sensing patterns 12 are decreased.

The respective protrusions 12b1 of the second sensing patterns 12b may protrude as much as an area corresponding to the respective indenting units 12a1 of the first sensing patterns 12a. The areas of the inwardly indented indenting units 12a1 of the first sensing patterns 12a and the areas of the outwardly protruding protrusions of the second sensing patterns 12b may be similar to each other or substantially the same.

The present embodiments are not limited thereto. The areas of the respective protrusions 12b1 of the second sensing patterns 12b may be smaller than those of the respective indenting units 21a1 of the first sensing patterns 12a. In that scenario, the first sensing patterns 12a and the second sensing patterns 12b may be arranged closer to each other.

When there is a large difference between the length of the long side and the length of the short side of the screen and a large difference between the base capacitances to be compensated, the areas of the respective protrusions 12b1 of the second sensing patterns 12b may be greater than those of the respective indenting units 12a1 of the first sensing patterns 12a.

When the pattern shapes of the first sensing patterns 12a and the second sensing patterns 12b are changed, the base capacitances in the long side direction (Y-axis direction) and in the short side direction (X-axis direction) of the screen may be matched to each other.

As the touch sensitivities in the long side direction and in the short side direction of the screen are similar to each other or the same, an error in the position detection is reduced and precision is improved. Thus, a touch screen panel with improved touch sensitivity may be provided.

A self-driving capacitive touch screen panel applies voltage or current to respective channels in the long side direction and in the short side direction of the screen, and detects whether a touch event is generated by measuring current or voltage generated. The detection occurs by applying current or voltage at a position where the current or the voltage is generated. Thus, the base capacitances in the respective directions are matched to each other so that error in detecting a position is reduced, and the touch sensitivity is improved.

The touch screen panel designed with the sensing patterns in the above-mentioned shape is directly formed on or attached to an upper substrate of a flat display panel. The flat panel display may be an organic light emitting display panel and a liquid crystal display panel.

The bridge patterns 14 for connecting the second sensing patterns 12b to each other, are made of low resistance metal. The low resistance metal has opaque properties to block light emitted from the flat display panel.

Respective pixels (not shown) formed on the display region of the flat display panel are arranged in the form of a matrix. The bridge patterns 14 may be arranged in the horizontal direction like the pixels (not shown) arranged on the display panel. When a part of the bridge patterns 14 are totally overlapped with the pixels formed in a corresponding region, light emitted from the overlapped pixels is blocked by the bridge patterns. Thus, a dark spot is generated.

In order to overcome the dark spots, in an embodiment illustrated in FIG. 2B, the bridge patterns 14 are obliquely arranged so that the overlapping with the pixels (not shown) is minimized. The pixels (not shown) are formed in a region corresponding to the bridge patterns. Thus, the above-mentioned dark spot may not be generated.

In the present embodiment, the bridge patterns 14 are arranged neither vertically nor horizontally but, arranged in an oblique pattern.

The bridge patterns 14 are formed on another layer by interposing an insulating layer between the second sensing patterns 12b. Also, the bridge patterns 14 are formed by electrically connect the second sensing patterns 12b to each other through contact holes 15 formed in the insulating layer.

The insulating layer may be made of silicon oxide ($SiO_2$) or silicon nitride (SiNx), and have a refractive index different from that of transparent conductive material. The transparent material may be used for forming the insulating layer and the first and second sensing patterns.

The refractive index of the silicon oxide is 1.5 and the refractive index of the transparent conductive material (ITO) is 1.97. Thus, the difference therebetween is large.

In a region between the sensing patterns 12a and 12b, i.e. a region where the transparent conductive material is not formed, the difference between refractive indices is directly apparent. The touch screen panel refracts and reflects both light from the display panel and external light. Thus, visibility of the display device is deteriorated.

In order to overcome the problem, in the embodiment illustrated in FIG. 1A, in regions 16 between the first sensing patterns 12a and the second sensing patterns 12b adjacent to each other, a plurality of island dummy patterns 16a may be formed to prevent the insulating layer from being revealed.

At this time, the dummy patterns 16a are made of the same transparent conductive material as those of the sensing patterns 12a and 12b, and by doing so, the insulating layer is prevented from being exposed as it is so that the deteriorated visibility generated by the refractive index difference between the transparent conductive material and the insulating layer may be overcome.

Figure 3A:
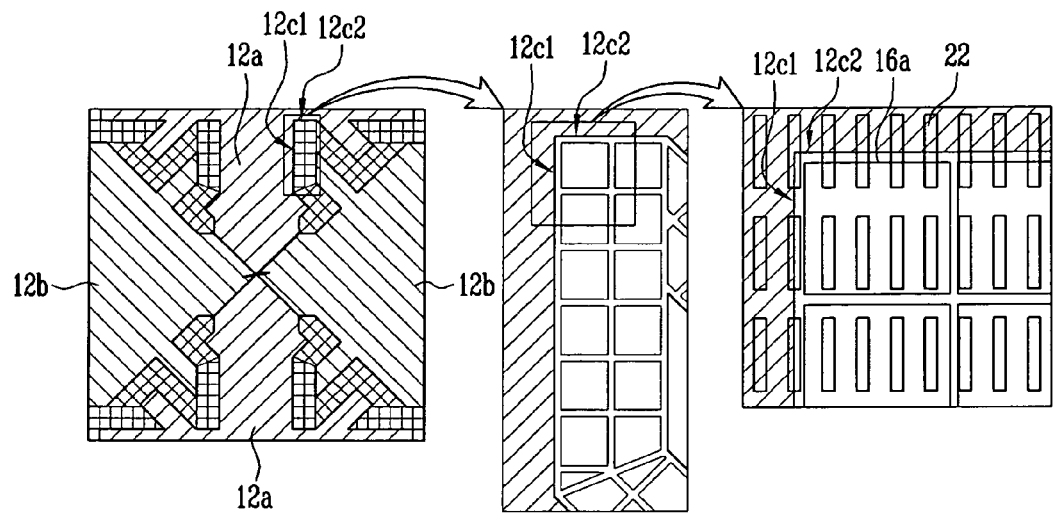
FIGS. 3A and 3B illustrate views of shapes of edge units of the sensing patterns of FIG. 2.
Figure 3B:
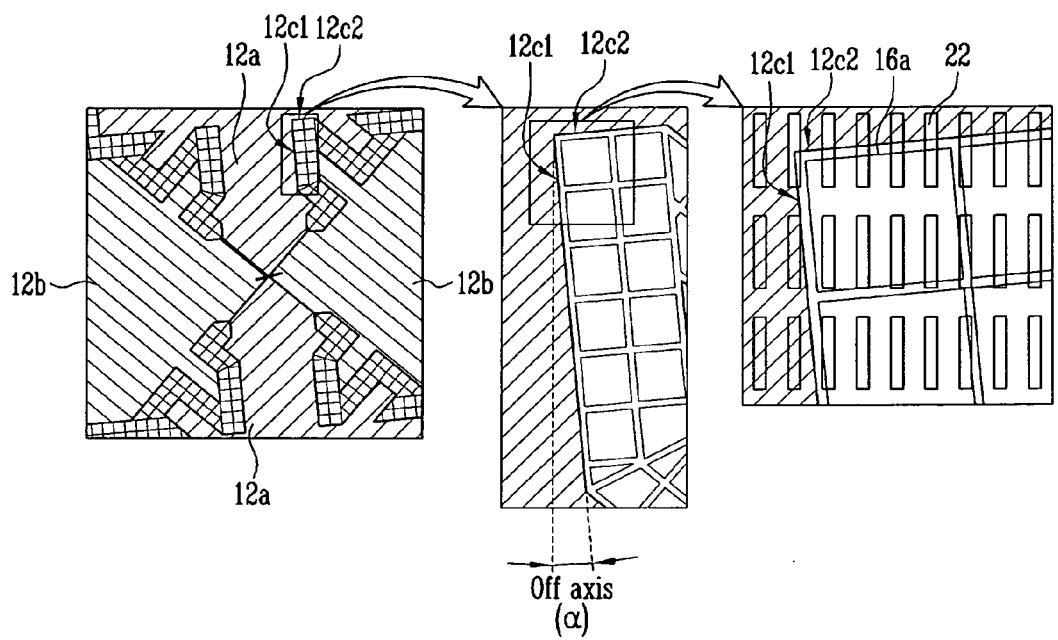

FIGS. 3A-3B are views illustrating shapes of edge units of the sensing patterns of FIG. 2.

FIG. 3A illustrates problems when edges of the sensing patterns are formed horizontally and vertically. FIG. 3B shows the edges of the sensing patterns titled by a predetermined angle according to an embodiment.

Referring to FIG. 3A, a touch screen panel designed with sensing patterns 12a and 12b is directly formed on or attached to an upper substrate of a flat display panel. The flat panel display may be an organic light emitting display panel and a liquid crystal display panel.

The sensing patterns 12a and 12b are formed in regions overlapped with a plurality of pixels 22. The plurality of pixels 22 is provided in a pixel region of the flat display panel. As resolution is high for the pixels 22, a certain interference fringe may be observed on a screen. The pixels 22 are provided in the pixel region of the flat panel display. The interference fringe occurs where light passes the display panel and the touch screen panel.

Size and pitches of the pixels 22 are smaller as the display panel has a high resolution. Therefore, the possibility that light emitted from the display panel is refracted or scattered is increased at vertical edges 12c1 and horizontal edges 12c2 of the sensing patterns 12a and 12b of the touch screen panel.

FIGS. 3A-3B illustrate the vertical and horizontal edges 12c1 and 12c2 have refraction or scattering. In FIGS. 3A-3B, the vertical and horizontal edges 12c1 and 12c2 of the sensing patterns correspond to the indenting units of the first sensing patterns. However, the vertical and horizontal edges of the sensing patterns, are not limited thereto. Vertical edges (parallel to Y-axis) or horizontal edges (parallel to X-axis) of overall edges of the first sensing patterns 12a and the second sensing patterns 12b will also be described.

A reference numeral 16a of FIGS. 3A-3B is assigned to a plurality of island dummy patterns 16a formed in regions between the first and second sensing patterns 12a and 12b. As referenced in FIG. 2A, the first and second sensing patterns 12a and 12b are adjacent to each other.

As illustrated in FIG. 3A, the respective pixels 22 formed on the display panel (not shown) are rectangular. When the touch screen panel is bonded on the display panel, there is a high possibility that columns of the pixels of the display panel meet the vertical and horizontal edges 12c1 and 12c2 of the sensing patterns of the touch screen panel at a specific position in one line. Therefore, the light generated from the pixels 22 is refracted in the vertical and/or horizontal edges of the sensing patterns to generate interference fringes.

In the present embodiment, in order to overcome this problem of interference fringes, the vertical/horizontal edges 12c1 and 12c2 of the sensing patterns of the touch screen panel are tilted by a predetermined angle α so that columns (or rows) of the pixels 22 of the display panel are prevented from being arranged parallel to the vertical/horizontal edges 12c1 and 12c2. The vertical/horizontal edges 12c1 and 12c2 of the sensing patterns of the touch screen panel are illustrated in FIG. 3B.

The edges 12c1 and 12c2 of the sensing patterns are tilted by a predetermined angle to eliminate vertical or horizontal components. The tilting minimizes the number of pixels 22 overlapped on the edge line and minimizes refraction and scattering of light. Thus, defective interference fringe may be removed.

The tilt angle α may be neither vertical nor horizontal. However, the tilt angle α may be an arbitrary angle unless there is a problem in operating the touch sensor. For example, the visibility may be reduced by an off axis by about 2-10 degrees.

Optical interference between the sensing patterns 12a and 12b of the touch screen panel and the pixels 22 of the display panel is closely correlated with a pitch of the patterns. For example, when the pitch of the pixels 22 is multiple of a pitch of the sensing patterns 12a and 12b by any factor that is an integer, the pixels of the display panel and the sensing patterns of the touch screen panel are repeated at the same position. Therefore, the interference fringe is generated and may be recognized by the human eye. The interference fringe may create an observable optical regularity, i.e. Moire patterns.

In the present embodiment, the pitch of the pixels 22 and the pitches of the sensing patterns 12a and 12b are designed not to be multiple of a pitch of the sensing patterns 12a and 12b by any factor that is an integer so that defective interference fringe may be removed by arranging the pixels and the sensing patterns in a random pattern.

However, in the embodiment as illustrated in FIGS. 3A and 3B, the dummy patterns have a right rectangular shape. In this case, vertical/horizontal edge units of the dummy patterns 16a are aligned with the corresponding pixels 22 (FIG. 3A) or a length in which the vertical/horizontal edge units of the dummy patterns 16a are overlapped with the pixels becomes longer (FIG. 3B).

In this case, as described above, light generated from the pixel 22 may be refracted by the vertical and/or horizontal edge units of the dummy patterns 16a to generate interference fringe.

Therefore, in another embodiment, the structure of dummy patterns optimized in order to improve visibility of pixels corresponding to the dummy patterns will be described.

Figure 4A:
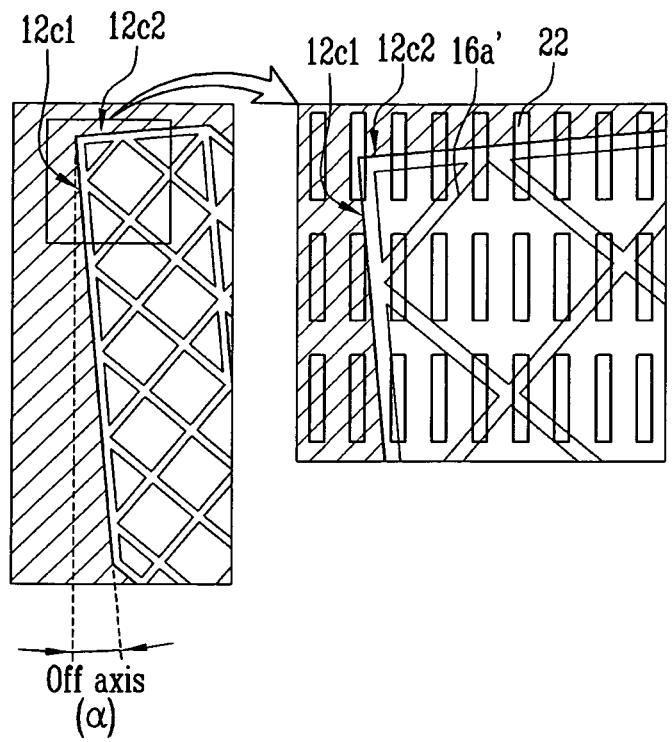
FIGS. 4A and 4B illustrates sectional views of structures of structures of dummy patterns according to another embodiment.
Figure 4B:
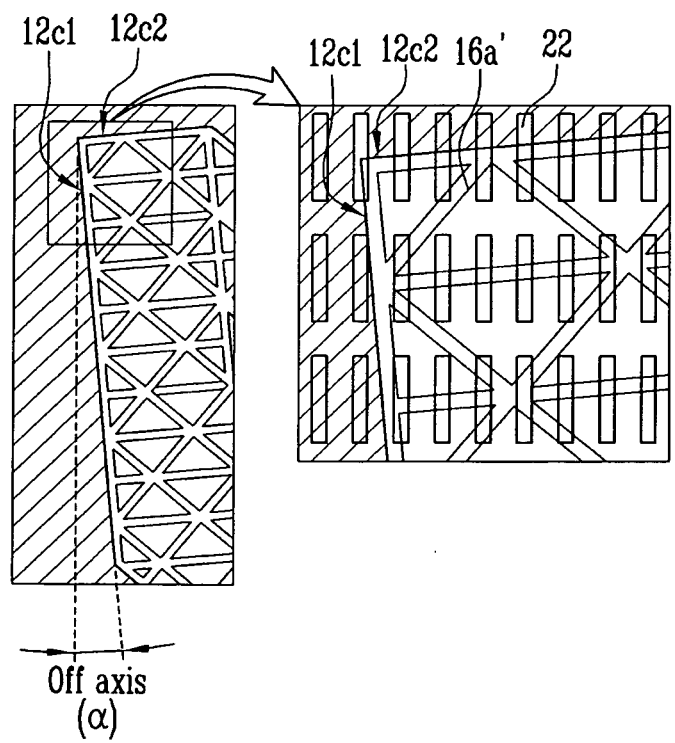

FIGS. 4A and 4B are sectional views illustrating a structure of dummy patterns according to another embodiment.

FIGS. 4A and 4B show the above-mentioned dummy pattern region of FIG. 3, i.e., the same region as that of the enlarged view.

Dummy patterns 16a', according to another embodiment, are illustrated in FIG. 4. Dummy patterns 16a' are implemented such that a length, in which vertical and/or horizontal edge units of the dummy patterns 16a' are overlapped with the pixels 22, is minimal. Thus, the dummy patterns 16a' overcome drawbacks of the dummy patterns 16a illustrated in FIG. 3.

The overlapped length of the dummy patterns with the pixels 22 is minimized through the structure of the dummy patterns 16a' so that the interference fringe can be minimized. The interference fringe is generated by light from the pixels 22, refracted by the edge units of the dummy patterns.

The vertical and/or horizontal edge units of the dummy patterns may be inclined by about 10 degrees to 80 degrees against the arranging direction of the pixels 22 (X-axis or Y-axis).

The dummy patterns 16a' may have a triangular shape, a diamond shape, a pentagonal shape, and a hexagonal shape. FIG. 4A shows the edge units of the dummy patterns 16a' having a diamond shape with about 45 degrees. FIG. 4B shows the dummy patterns 16a having a triangular shape.

Figure 5:
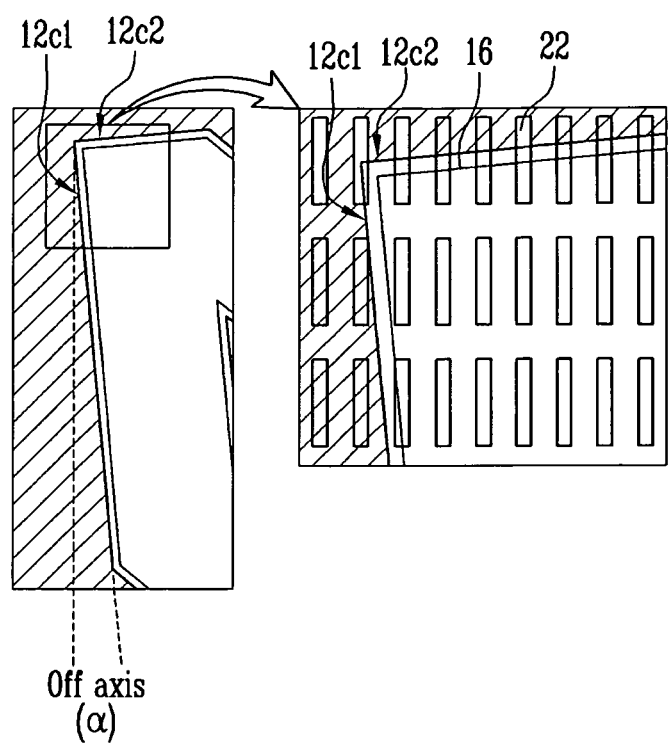
FIG. 5 illustrates a sectional view of a structure of a dummy pattern according to still another embodiment.

FIG. 5 is a sectional view illustrating a structure of dummy patterns according to still another embodiment.

FIG. 5 shows the dummy pattern region as illustrated in FIG. 3B, i.e., the same region as that of the enlarged view.

The dummy patterns 16, according to still another embodiment, are illustrated in FIG. 5. The dummy patterns 16 are different from embodiments illustrated in FIGS. 3 and 4. The dummy patterns 16 are not implemented by a plurality of island dummy patterns, but are integrally connected into a single body between adjacent first and second sensing patterns 12a and 12b.

According to the dummy patterns 16 illustrated in FIG. 5, the refraction difference between the existing island dummy patterns 16a and 16a' and scattering of light from the pixels 22 overlapped with the dummy patterns 16a and 16a', may be minimized so that visibility can be improved.

By way of summation and review, in the related art, the first and second sensing patterns are formed in the same layer. The first sensing patterns or the second sensing patterns are generally connected to separated low resistance metal bridge patterns.

In the touch screen panel of the related art, the bridge patterns are realized by an opaque metal. Thus, pixels are screened when pixels of an image display device positioned under the touch screen panel overlaps the connecting patterns.

Areas of respective pixels are decreased as resolution of the image display device is gradually increased. Therefore, the number of pixels screened by the bridge patterns may be increased. Pixels screened by the bridge patterns appear as a dark spot according to viewing angles. Thus, external visibility becomes worse.

According to a present embodiment, in forming the first sensing patterns arranged in the first direction, the second sensing patterns arranged in the second direction, and the bridge patterns for connecting the first or the second sensing patterns to each other, which are arranged on the same layer, areas of the first sensing patterns and the second sensing patterns are different from each other. Thus, the touch sensitivity may be improved.

In addition, vertical/horizontal edge units of the first and second sensing patterns, which are formed on the touch screen panel, are obliquely formed by a predetermined angle so that the interference the sensing patterns with the pixels arranged in the display region of the flat display panel in the form of stripes may be prevented. Thus, visibility may be improved.

The structure of the dummy patterns formed in a region between the first and second adjacent sensing patterns is optimized so that visibility of pixels corresponding to the dummy patterns may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made.

What is claimed is:

1. A touch screen panel, comprising: a plurality of first sensing patterns arranged and connected to each other in a long side direction of a screen, each of the first sensing patterns having a polygon shape and including at least one indenting unit inwardly indented from at least one side thereof; and a plurality of second sensing patterns arranged and connected to each other in a short side direction of the screen, each of the second sensing patterns having a polygon shape and including at least one protrusion protruding outwardly from at least one side thereof, wherein: an area of each of the first sensing patterns is less than an area of each of the second sensing patterns, the first sensing patterns or the second sensing patterns are electrically connected to adjacent sensing patterns on a same line by bridge patterns, and the bridge patterns are each obliquely arranged so as to not be aligned in the long side direction in which the first sensing patterns are arranged or in the short side direction in which the second sensing patterns are arranged, wherein the first sensing patterns and the second sensing patterns are on an upper substrate of a flat display panel, further comprising: a dummy pattern between the first sensing patterns and the second sensing patterns, wherein the dummy pattern includes a plurality of island dummy patterns, wherein horizontal edge units and vertical edge units of the plurality of island dummy patterns are implemented such that a length, in which the horizontal edge units and the vertical edge units are overlapped with a plurality of pixels, is minimal, and wherein horizontal edge units and vertical edge units of the island dummy patterns, the first sensing patterns, and the second sensing patterns have an angle of 10 degrees to 80 degrees, against the arrangement direction of the pixels.

2. The touch screen panel as claimed in claim 1, wherein vertical and horizontal edges of the first sensing patterns and the second sensing patterns are tilted by a predetermined angle.

3. The touch screen panel as claimed in claim 2, wherein the predetermined angle ranges from 2 degrees to 10 degrees.

4. The touch screen panel as claimed in claim 1, wherein the bridge patterns are made of low resistance opaque metal.

5. The touch screen panel as claimed in claim 1, wherein the first sensing patterns and the second sensing patterns are made of transparent conductive material.

6. The touch screen panel as claimed in claim 1, wherein the at least one protrusions of the second sensing patterns include a plurality of protrusions, the at least one indenting unit of the first sensing patterns include a plurality of indenting units, and the protrusions of the second sensing patterns are positioned in a space generated by the indenting units of the first sensing patterns.

7. The touch screen panel as claimed in claim 1, wherein the first sensing patterns and the second sensing patterns are formed in regions where the first and second sensing patterns are in an overlapping relationship with a plurality of pixels provided in a pixel region of the flat display panel, and a pitch of the pixels is not a multiple of a pitch of the first and second sensing patterns by any factor that is an integer.

8. The touch screen panel as claimed in claim 1, wherein the dummy pattern is made of a same transparent conductive material as that of the first sensing patterns and the second sensing patterns.

9. The touch screen panel as claimed in claim 1, wherein the island dummy patterns have a polygonal shape.

10. The touch screen panel as claimed in claim 1, wherein the dummy patterns are coupled with each other between the first sensing patterns and the second sensing patterns.

* * * * *